US008208523B2

(12) United States Patent
Wong et al.

(10) Patent No.: US 8,208,523 B2

(45) Date of Patent: Jun. 26, 2012

(54) DIGITAL ADAPTATION CIRCUITRY AND METHODS FOR PROGRAMMABLE LOGIC DEVICES

(75) Inventors: Wilson Wong, San Francisco, CA (US); Doris Po Ching Chan, Santa Clara, CA (US); Sergey Shumarayev, San Leandro, CA (US); Simardeep Maangat, Sunnyvale, CA (US); Tim Tri Hoang, San Jose, CA (US); Tin H. Lai, San Jose, CA (US); Thungoc M. Tran, San Jose, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/079,420

(22) Filed: Apr. 4, 2011

(65) Prior Publication Data

US 2011/0188564 A1 Aug. 4, 2011

Related U.S. Application Data

(63) Continuation of application No. 11/522,284, filed on Sep. 14, 2006, now Pat. No. 7,920,621.

(51) Int. Cl.
*H03H 7/30* (2006.01)

(52) U.S. Cl. ........................................ 375/229

(58) Field of Classification Search .................. 375/229, 375/230, 231, 232
See application file for complete search history.

(56) References Cited

U.S. PATENT DOCUMENTS 6,055,269 A 4/2000 Drost et al.
6,097,714 A 8/2000 Nagatani et al.
6,141,332 A 10/2000 Lavean
7,508,892 B2 3/2009 Kibune et al.
7,535,956 B2 5/2009 Yamaguchi
2005/0226355 A1 10/2005 Kibune et al.
2006/0176946 A1 8/2006 Yamaguchi
2007/0002942 A1 * 1/2007 Simpson et al. .............. 375/229
2007/0253475 A1 11/2007 Palmer
2007/0297248 A1 12/2007 Hidaka

FOREIGN PATENT DOCUMENTS

GB 2423902 9/2006
JP 61-105933 5/1986
JP 2004-208222 7/2004
JP 2005-303607 10/2005
JP 2006-222809 8/2006

OTHER PUBLICATIONS

International Business Machines Corporation, "Equalization Method for High-Speed Serial Links," Research Disclosure, Mason Publications, Hampshire, GB, vol. 453, No. 87, Jan. 2002.

J-S. Choi et al., "A 0.181μm CMOS 3.5-Gb/s Continuous-Time Adaptive Cable Equalizer Using Enhanced Low-Frequency Gain Control Method," IEEE Journal of Solid-State Circuits, vol. 39, No. 3, Mar. 2004, pp. 419-425.

* cited by examiner

*Primary Examiner* — Jaison Joseph

(74) *Attorney, Agent, or Firm* — Ropes & Gray LLP

(57) ABSTRACT

Equalization of an incoming data signal can be controlled by sampling that signal at times when data values in that signal should be stable ("data samples") and when that signal should be in transition between successive data values that are different ("transition samples"). A transition sample that has been taken between two successive differently valued data samples is compared to a reference value (which can be one of those two data samples). The result of this comparison can be used as part of a determination as to whether to increase or decrease equalization of the incoming data signal.

19 Claims, 6 Drawing Sheets

10
IN
20
EQ. FILTER
30
α
HP
50
β
110
112
120
122
130
A
CMP
150
LOW-PASS FILTER
RECTIFIER
160
162
B
170
HIGH-PASS FILTER
172
OUT
ERROR AMPLIFIER
180
100
C1
C2

CK0
CK90
CK180
CK270
DEVEN
DMQ
DODD
DMQB
D0
DM01
D1
D10
DM12
D2

| A | T | B | CONDITION |
|---|---|---|---|
| 0 | 1 | 1 | OVER EQUALIZED |
| 1 | 0 | 0 | OVER EQUALIZED |
| 1 | 1 | 0 | UNDER EQUALIZED |
| 0 | 0 | 1 | UNDER EQUALIZED |

DIGITAL ADAPTATION CIRCUITRY AND METHODS FOR PROGRAMMABLE LOGIC DEVICES

CROSS-REFERENCE TO RELATED APPLICATIONS

This application is a continuation of, and claims the benefit of and priority to, U.S. patent application Ser. No. 11/522,284, filed Sep. 14, 2006 (currently pending), which is hereby incorporated by reference in its entirety.

BACKGROUND OF THE INVENTION

When a high-speed signal propagates through a transmission medium such as a printed circuit board backplane, not all of the frequency components get attenuated equally. In general, high frequency components are attenuated more than low frequency components. The result is ISI (inter-symbol interference), which causes jitter in the ideal timing of a signal.

Equalization is a method to boost the high frequency components more than the low frequency components. Ideally the frequency response of the equalizer should be the inverse transfer function of the backplane or other transmission medium. The combination of the two transfer functions should ideally be flat for the frequencies of interest. The problem is that there may be many possible combinations of equalization solutions. It may therefore require a lot of time to determine the optimal setting. This is usually through trial and error.

An adaptive equalization block can take the burden off the user and determine the optimal setting. An adaptive equalizer includes an equalizer and an adaptation "engine" which chooses one of the possible equalization curves so that the combination of the two transfer functions is flat. Because of the benefits of using adaptive equalization, improvements to adaptive equalizer blocks are always being sought.

SUMMARY OF THE INVENTION

In accordance with certain aspects of the invention, equalization of an incoming data signal may be controlled by detecting two successive differently valued bits in the data signal. When two such bits are detected, a determination can be made as to whether a transition between those bits is relatively late or relatively early. If the transition is relatively late, then equalization of the incoming signal can be increased. If the transition is relatively early, then equalization of the incoming signal can be deceased.

In accordance with other aspects of the invention, equalization of an incoming data signal may be controlled by sampling that signal at times when data values in the signal should be stable. This sampling produces what may be called data samples. The incoming data signal may also be sampled at times when that signal should be in transition between successive data values that are different from one another. This sampling produces what may be called transition samples. A transition sample that has been taken between two successive differently valued data samples may be compared to a reference value (which can be one of the two differently valued data samples). The equalization may be controlled based on a result of this comparison.

In accordance with still other aspects of the invention, circuitry for equalizing an incoming data signal may include first sampling circuitry for sampling the incoming data signal at times when data values in that signal should be stable. The resulting samples may be referred to as data samples. The equalizing circuitry may further include second sampling circuitry for sampling the incoming data signal at times when that signal should be in transition between successive data values that are different from one another. The resulting samples may be referred to as transition samples. The equalizing circuitry may still further include circuitry for comparing a transition sample (taken between two successive differently valued data samples) to a reference value (which can be one of the two successive differently valued data samples). The equalizing circuitry may still further include equalization control circuitry for controlling equalization of the incoming data signal based on an output of the comparison circuitry.

Further features of the invention, its nature and various advantages, will be more apparent from the accompanying drawings and the following detailed description.

DETAILED DESCRIPTION

Figure 1:
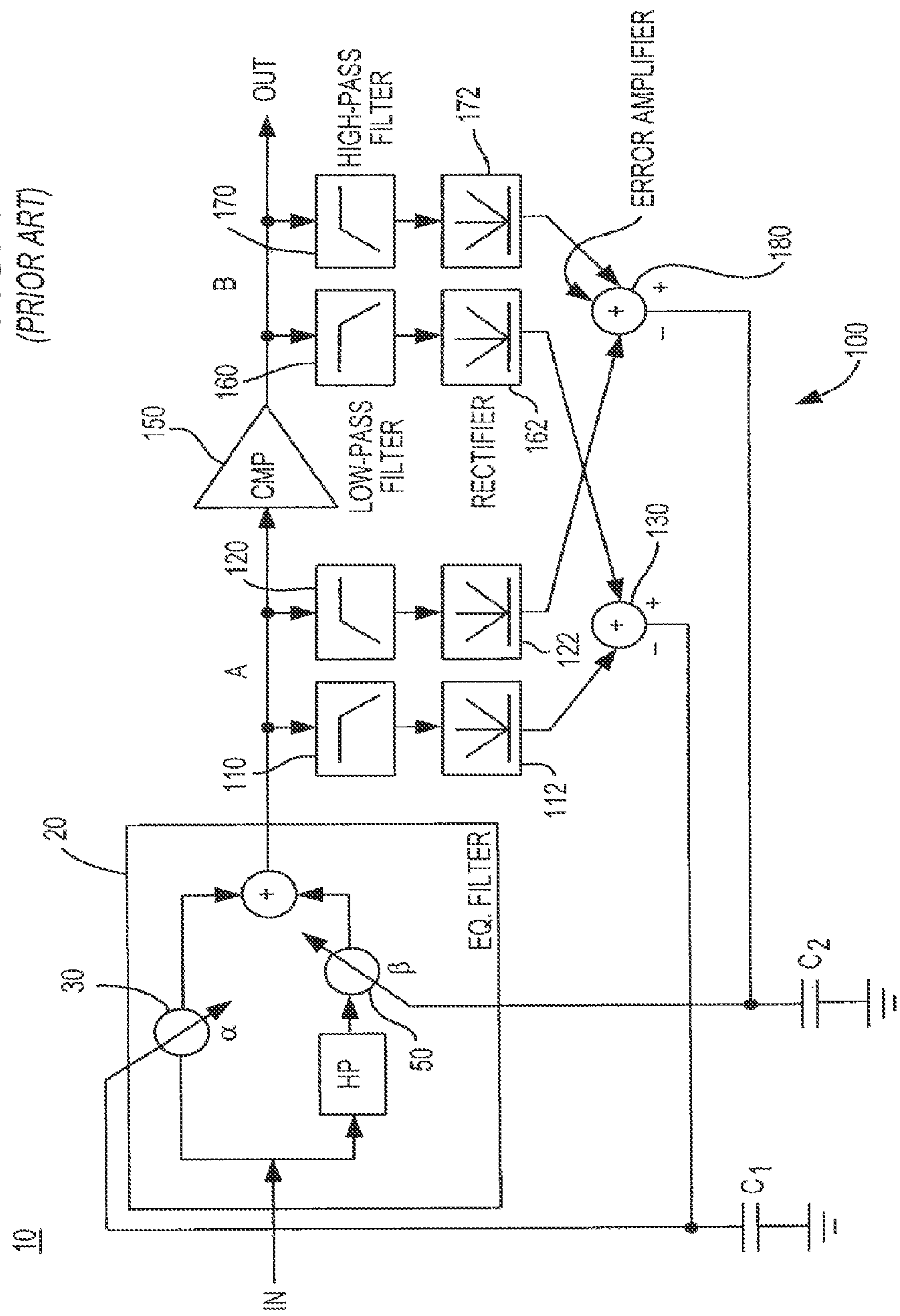
FIG. 1 is a simplified schematic block diagram of a known scheme for an adaptive engine.

A known scheme for an adaptive equalization block 10 is shown in FIG. 1. This scheme includes an equalizer filter 20 with control knobs 30 and 50 (typically implemented electronically) to change the amount of low and high frequency boost. Parameter $\alpha$ changes the amount of low frequency gain, while parameter $\beta$ changes the amount of high frequency boost from the equalizer. (HP stands for high pass.) In addition to the equalizer filter, the remaining circuits in FIG. 1 comprise the adaptive engine 100, which controls the amount of boost via the knobs $\alpha$ and $\beta$.

The adaptive scheme in FIG. 1 uses an analog approach to determine whether the amount of boost is correct. Node A is the output of the equalizer 20, and node B is the output of a reference edge generator 150. The reference edge generator outputs an "ideal" edge, which the output of the equalizer should try to mimic. The low pass and high pass filters 110, 120, 160, and 170, along with the rectifiers 112, 122, 162, and 172, are used to extract the energy of the signals at nodes A and B. The output of the high pass filter 120 and rectifier 122 on node A extracts the high frequency energy of the signal after the equalizer 20. The output of the high pass filter 170 and rectifier 172 on node B extracts the high frequency energy of the signal after the reference generator 150. These two levels are then presented to the comparator 180, which compares the high frequency energy between the two outputs. The result of the comparison is integrated on capacitor C2 to create an analog level, which controls the amount of high frequency boost. This is part of a feedback system, which forces the energies to be equal, and thus the "proper" amount of high frequency boost. This ideally occurs when the edge rate of the equalizer 20 output is equal to the edge rate of the reference generator 150 output. The amount of low frequency gain is controlled in a similar manner via the low pass filters and rectifiers 110, 112, 160, and 162 in cooperation with comparator 130 and capacitor C1.

Figure 2:
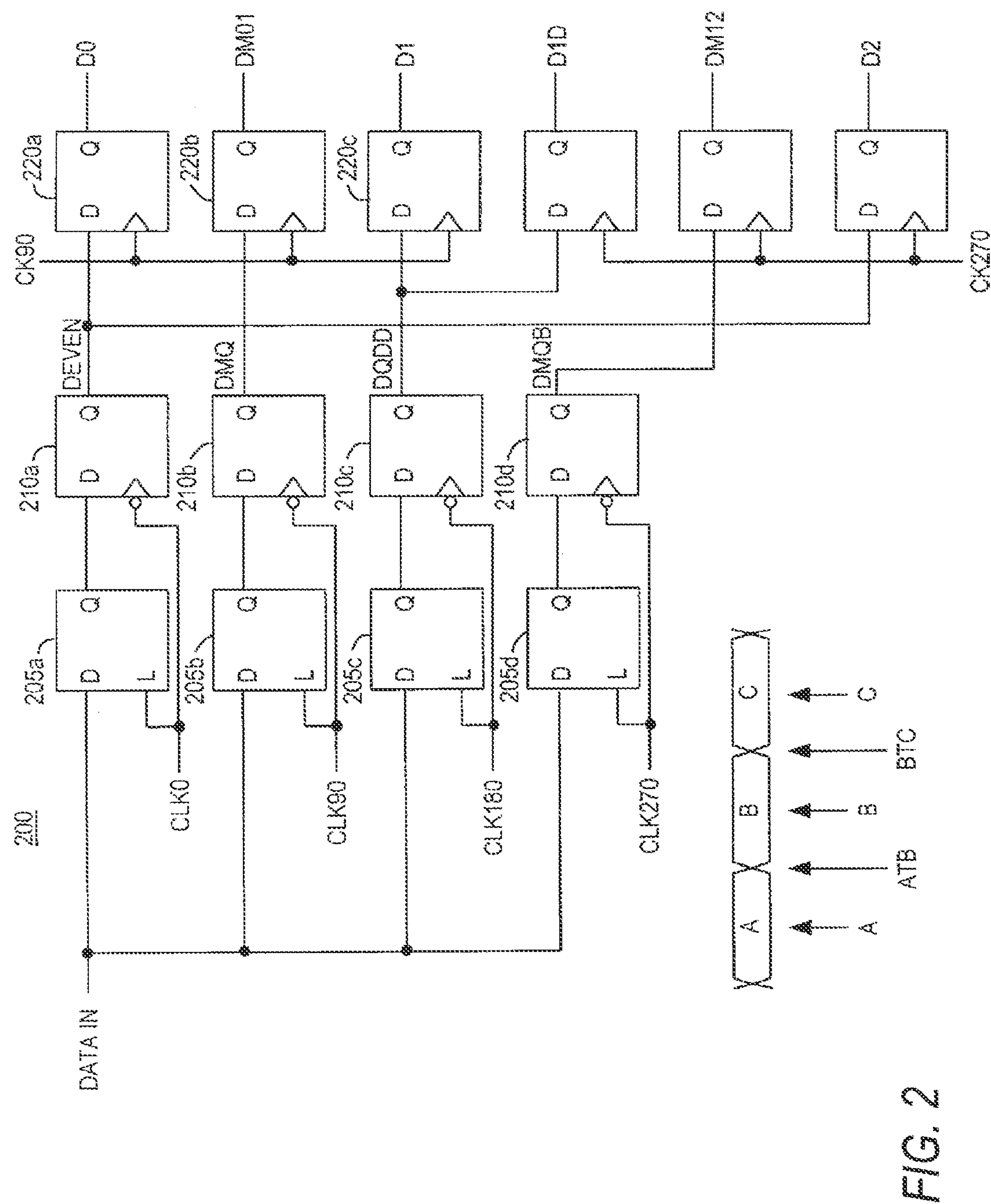
FIG. 2 is a simplified schematic block diagram of an illustrative embodiment of some circuitry in accordance with certain aspects of the invention.
Figure 3:
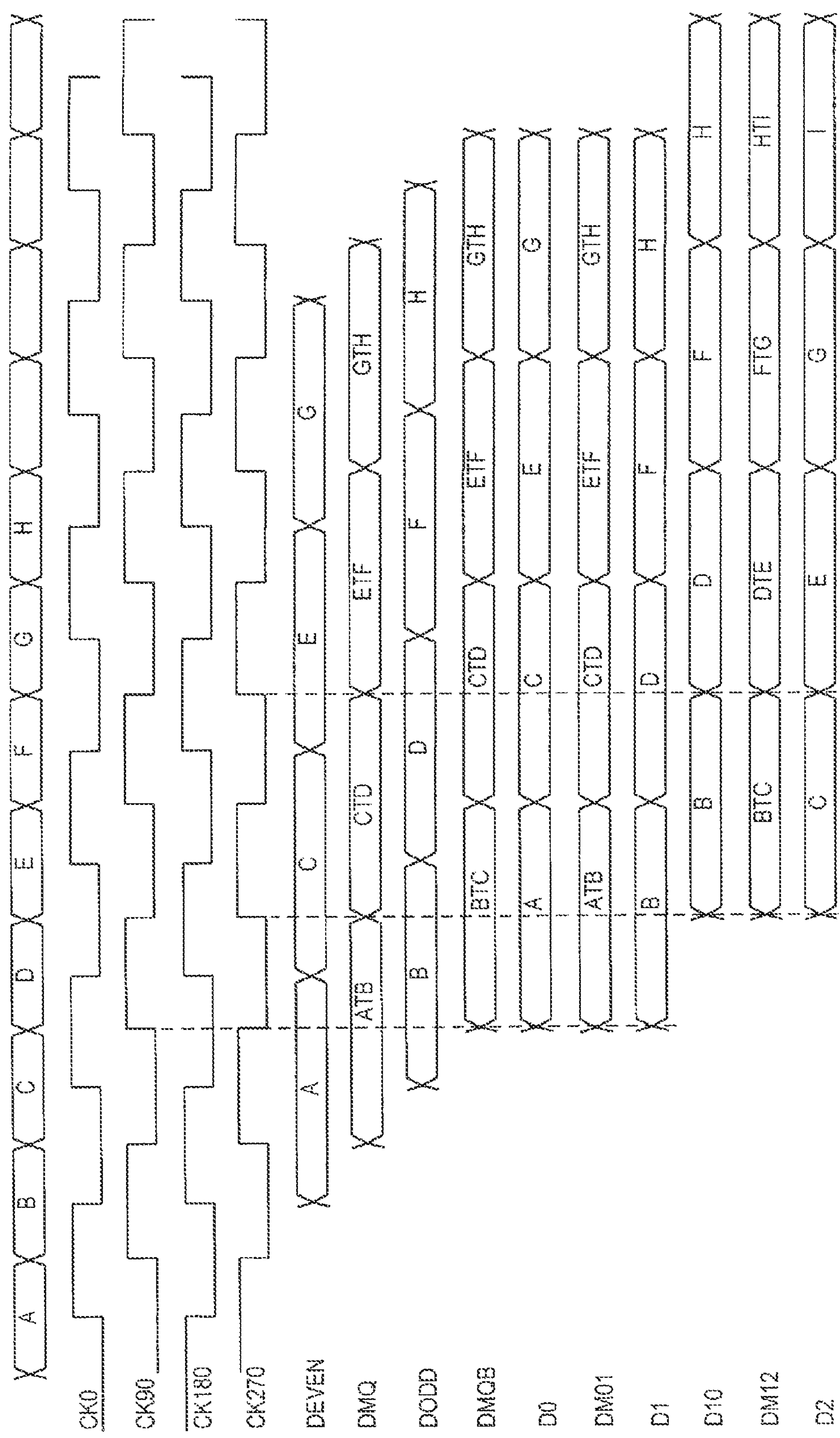
FIG. 3 is a set of simplified signal waveforms, all plotted against a common, horizontal time scale. These waveforms are useful in understanding operation of the FIG. 2 circuitry.

The present disclosure describes an adaptive engine which uses a digital approach. Instead of comparing energy levels of the equalizer 20 output and the output of a reference edge 150, the absolute timing jitter is compared by a digital phase detector. FIG. 2 shows details of an illustrative digital phase detector 200. FIG. 3 shows the timing generated by phase detector 200. The small timing diagram in FIG. 2 shows the terminology used. "A", "B," and "C" refer to the relative locations of three consecutive bits A, B, and C, respectively. "ATB" is the transition point sampled by the phase detector between bits A and B. "BTC" is the transition point sampled between bits B and C. These points are sampled by a half rate phase detection scheme. Half rate refers to the fact that the clock runs at half the rate of the data. Full rate implies that each rising edge of a clock samples data.

As shown in FIG. 2, the first two columns of flip flops 205*a-d* and 210*a-d* are clocked by a four-phase clock with phases 0, 90, 180, and 270 running at half the data rate. These flip flops sample the data and generate the outputs DEVEN, DMQ, DODD, and DMQB, respectively. In the timing diagram these points represent sample points A, ATB, B, and BTC, respectively. In the rest of this discussion we will use these representations interchangeably. The important thing to note is that DEVEN corresponds to sampling of bit location A. The timing diagram in FIG. 3 shows how this is accomplished. Note that sampling the incoming data signal at points like A, B, and C corresponds to sampling that signal at times when data values in the signal should be stable at binary 1 or binary 0. Such samples may be referred to as data samples. Sampling the incoming data signal at points like ATB and BTC corresponds to sampling that signal at times when the signal should be in transition between two successive differently valued data bits or data samples. Samples taken at points like ATB and BTC may be referred to as transition samples.

Figures 4, 5:
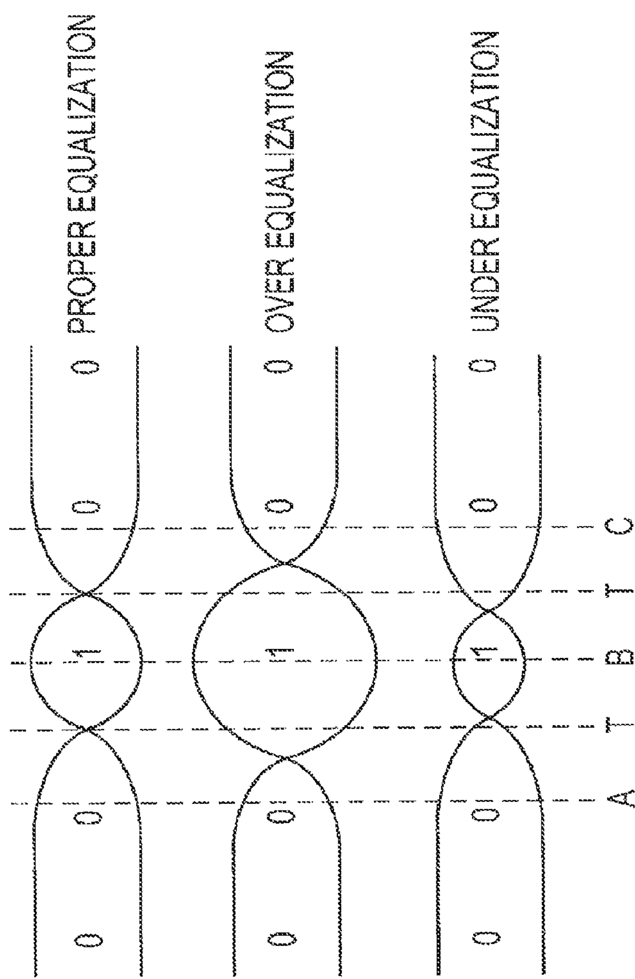
FIG. 4 is a further set of illustrative, simplified waveforms that are useful in understanding certain aspects of the invention.
FIG. 5 is a table showing decisions that can be made under various illustrative signal conditions in accordance with certain aspects of the invention.

The flip flops 220*a-c* that generate outputs D0, DM01 and D1 are clocked by CK90. The purpose of these flip flops is to synchronize A, ATB, and B (or take a snapshot of these bits) and hold the value so that it can be examined. The flip flops 220*d-f* that generate D1D, DM12, and D2 synchronize B, BTC, and C and hold the value so that it can be examined. FIG. 4 shows how the outputs of the phase detector can be examined to determine if the amount of equalization is correct. Also, note in FIG. 4 that the binary values 0 and 1 can be interchanged and in the interest of brevity we just discuss one case. For example, we could have replaced all the zeros with ones and vice-versa.

In order that this scheme works properly, this phase detector is preferably shared with the phase detector used in the receiver clock and data recovery (CDR) block. This is the same phase detector used by the CDR to properly center the data eye (i.e., to find where sampling points like A, B, and C should be in order to be most nearly centered between transition locations (like ATB and BTC) in the incoming data signal). Thus, in this disclosure we can assume that clock CK0 samples at the optimal point of data A, CK90 samples the transition point between bits A and B and so on. Three timing diagrams in FIG. 4 show what would be sampled by the flip flops if the amount of equalization is ideal (top waveform), too small (bottom waveform), or too large (middle waveform). Note that in the middle waveform in FIG. 4 the transition from A to B is relatively early (e.g., as compared to the corresponding, properly timed transition in the top waveform, or as compared to the corresponding, relatively late transition in the bottom waveform). On the other hand, in the bottom waveform in FIG. 4 the transition from A to B is relatively late (e.g., as compared to the corresponding, properly timed transition in the top waveform, or as compared to the corresponding, relatively early transition in the middle waveform).

FIG. 5 shows an illustrative example of how to determine the equalization based on the sampled values. A scheme is given based on a different sequence of bits detected. In this scheme, an incoming data pattern of 001 (shown by the binary digits in FIG. 4) or 110 (bits inverted from what is shown by the binary digits in FIG. 4) is detected and the outputs based on the detected sequence are used to determine the equalization level. As shown in FIG. 5, an over-equalized signal is seen as the transition sample T having the same value as the 2nd data sample bit B (or the complement or inverse of 1st data sample bit A). An under-equalized signal, on the other hand, is seen as the transition sample T looking like the 1st data sample bit A (or the complement or inverse of 2nd data sample bit B). This is just one illustrative incoming data sequence, and any number of other sequences can be detected and used to determine if the amount of equalization is too small or too large. The point is that a pattern detector is preferably employed, and the appropriate sample points are observed to determine if the equalization needs to be adjusted. 001 or 110 was chosen as the pattern to be detected in this example because it is a pattern which allows a signal to "settle" near its final value (in response to the first two identical bits), and then a higher frequency component is introduced (in order to transition to the third, differently valued bit). The ideal pattern might be one having a relatively long CID (consecutive identical digit) followed by a transition. Thus, a pattern such as . . . 0000001 . . . or . . . 1111110 . . . would be a good candidate. The tradeoff, however, would be that such a long CID may happen relatively infrequently, if ever. This might lead to unacceptably long convergence times. Additionally, most patterns are DC balanced and have a minimum required transition density that prohibits very long CIDs, an example being 8b10b. The other tradeoff would be that a very long string of latches would be required to "remember" the data so that the pattern is detected.

As mentioned earlier, the phase detection circuitry preferably has the same timing as the phase detector of the CDR (clock and data recovery) block. Recall that the purpose of the CDR is to extract the clock embedded in a high-speed serial data stream. The CDR extracts a clock and lines up the phase such that it is optimally centered about the middle of the data for CK0 and CK180. This puts data samples like A, B, and C in FIG. 2 midway between transitions like those at ATB and BTC in that FIG. Another point is that the CDR is typically a closed loop system with a certain bandwidth. Thus, during adaptation the two loops may interact. This timing can be important, which means that the adaptive circuitry should either share the phase detector with the CDR or have an exact or close replica. It may be more practical to use the same circuitry. It is desirable to properly design the bandwidth of the adaptation loop such that it does not significantly affect the convergence of the CDR loop. The adaptive loop is preferably designed so that its bandwidth is slower than the bandwidth of the CDR. This allows the CDR to sample the data and output a phase that roughly samples at the center of the data eye. The equalization is then updated at a lower rate and slowly reduces the jitter due to such issues as backplane attenuation.

Figure 6:
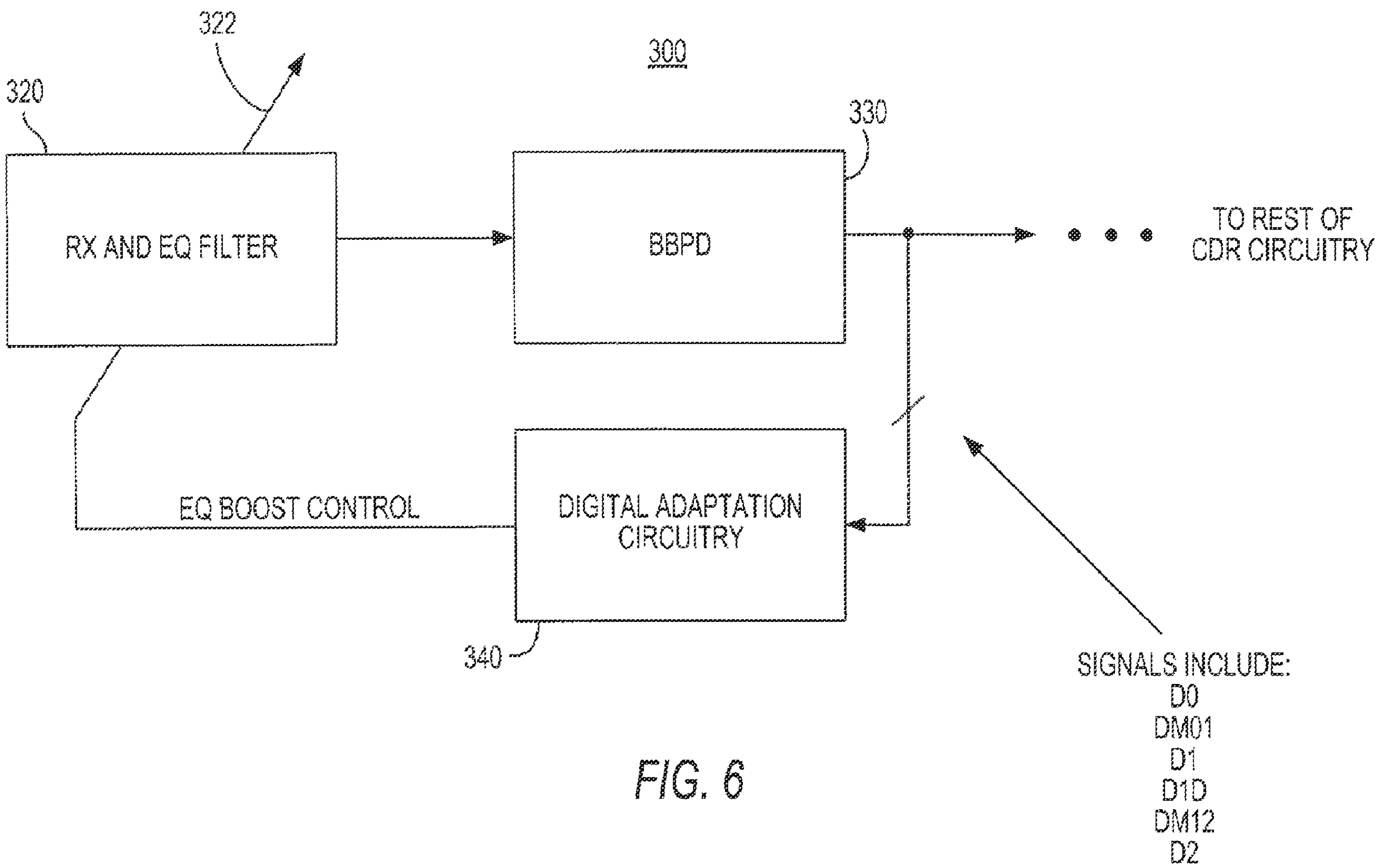
FIG. 6 is a simplified block diagram of illustrative equalizer circuitry in accordance with certain aspects of the invention.

FIG. 6 shows a block diagram for the digital adaptive scheme 300. It includes an equalizer filter 320 with a knob 322 (preferably implemented electronically) to control the amount of boost. The output of the equalizer feeds a phase detector 330 used in the CDR to properly align the edges to sample data at the center of the eye. (BBPD stands for bang-bang phase detector, which is a digital phase detector instead of a linear phase detector. It is called bang bang because it is binary. It outputs a binary charge or discharge current based on the phase relationship. It can also be tristate, but the width of the pulse is a fixed period (vs. a linear phase detector which outputs a pulse width proportional to the phase difference).) The phase detector 330 is fed by four phases of clock running at half the rate of the data. The outputs of the phase detector 330 that feed the adaptive engine 340 are D0, DM01, D1, D1D, DM12, and D2.

Figure 7:
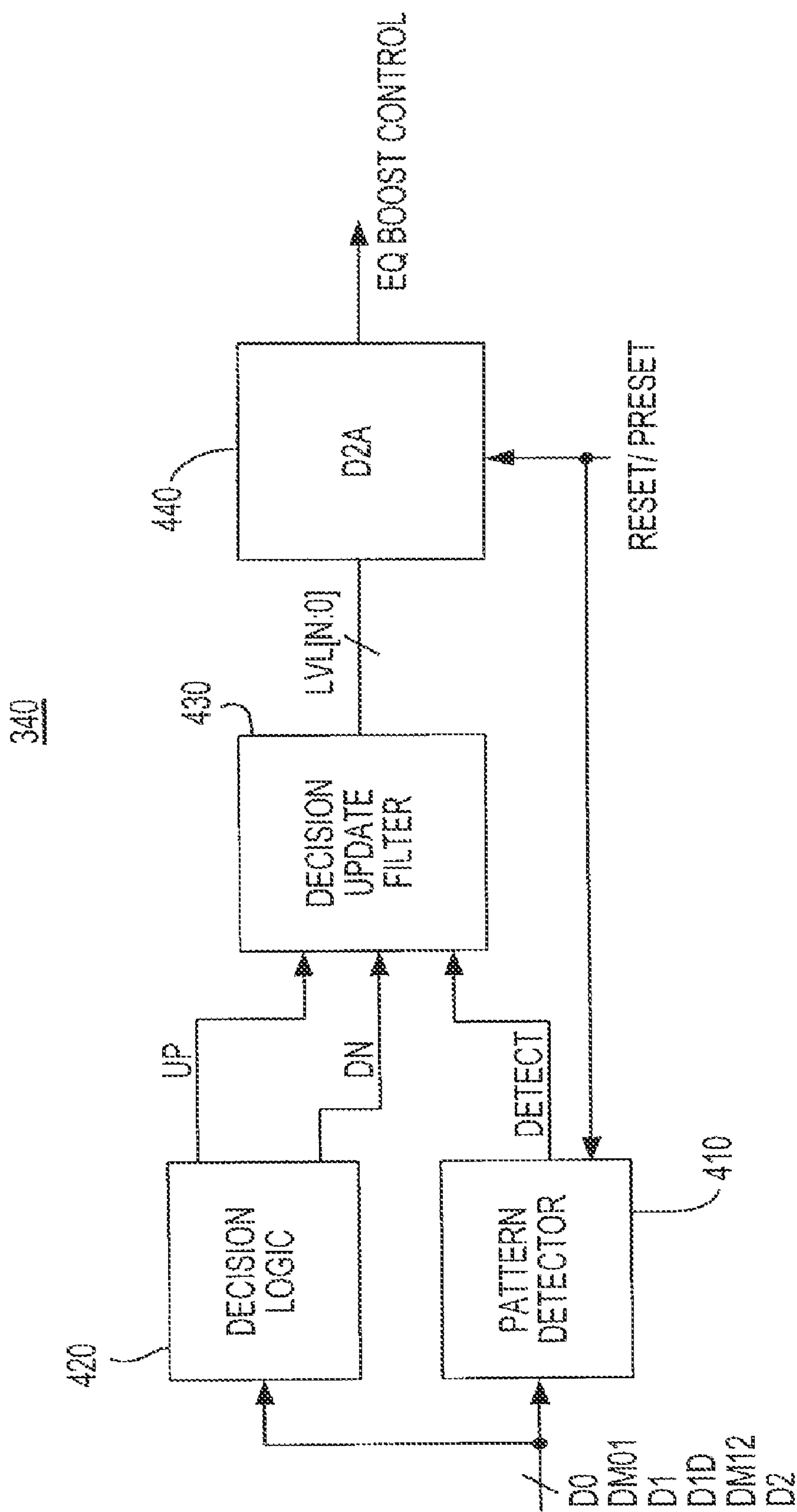
FIG. 7 is a more detailed, but still simplified, block diagram of an illustrative embodiment of a portion of the FIG. 6 circuitry in accordance with certain aspects of the invention.

FIG. 7 shows a diagram of the digital adaptation block 340. The inputs from the phase detector 330 are used by a pattern detector 410 and the decision logic 420. The pattern detector 410 will latch the input and then check if the pattern matches a predefined value (programmability of the pattern is desirable to allow a user to select what pattern(s) will be used). The required pattern is preferably a series of CID followed by a transition. The pattern examples used in the earlier discussion herein are 001 and 110. Of course, at a minimum, the pattern must include two successive differently valued data bits because the equalization determination is based on the timing of the transition between at least two such successive bits. At the same time, the decision logic block 420 also examines the latched data and outputs an UP or DN signal based on the truth table given in FIG. 5 or whatever other control logic is being employed. An UP means that more boost is required, while a DN requires reducing the boost. The decision update filter block 430 takes in the UP and DN signals as well as the detect signal. Based on this (e.g., block 430 is only enabled to use an UP or DN signal when the detect signal indicates that the predetermined data sample pattern has been detected), block 430 outputs a digital code that feeds a D2A (digital to analog) conversion block 440. The D2A block 440 generates an analog output that controls the amount of boost from the EQ (320 in FIG. 6). The decision update filter block 430 also preferably performs some filtering (e.g., integration over time) of the UP/DN/detect results and is able to control the update rate (this is again preferably programmable so that the user can select, for example, how fast or slow equalization adjustments are made). The update rate is preferably variable, because, as we mentioned earlier, the adaptation loop preferably runs slower than the CDR loop. One implementation is to have the decision update filter 430 count the (net) number of UP or DN pulses when DETECT is asserted and increment (or decrement) Lvl [n:0] after "x" number of DETECT pulses.

Another possible (and desirable) feature is for the equalization to be presettable. In many implementations the boost starts out at the minimum value. In the FIG. 1 prior art the amount of equalization is stored on capacitors C1 and C2. The initial state of the capacitors is usually 0 or a discharged condition. A presettable value is desirable because in very attenuated backplanes or other similar situations it may be possible that a single bit may not have a transition. Thus it is required that a certain amount of boost be "preset" to allow very attenuated bits to be boosted enough to be detected as a transition. The Reset/Preset pin allows presetting the output level of the D2A 440, as well as reset the output of the pattern detector 410 so that adaptation doesn't start until it is released.

There are many benefits and advantages to using the digital approach of this invention:

1. A digital approach allows easy migration from one technology to the next. Analog circuits do not "like" to shrink and many circuits may need to be redesigned. Digital circuits, on the other hand, run faster as the process shrinks. This benefits a digital approach.
2. The digital approach allows the adaptation circuitry to run as fast as the phase detector and is not the limit in the overall performance.
3. The digital approach allows the actual updating of the loop to be run at low speed. This can take a large burden off much of the feedback loop. This is done via the decision update filter block 430.
4. The digital approach has no requirements on transition density or run length. An analog approach cannot tolerate data patterns that don't have enough random frequency content. Additionally, very long CID patterns would cause problems for an analog approach.
5. The digital approach does not require the pattern to be DC balanced. An analog approach uses filters and DC blocking capacitors that can drift from the ideal operation if the pattern is not DC balanced.

It will be understood that the foregoing is only illustrative of the principles of the invention, and that various modifications can be made by those skilled in the art without departing from the scope and spirit of the invention. For example, the pattern of successive bits that is detected as a pre-condition to performing a determination as to whether a transition in the data signal is relatively early or relatively late can be of any desired length. Similarly, any number of UP/DN output signals of decision logic 420 can be integrated by decision update filter 430 prior to making a change in the signals that control the amount of equalization.

What is claimed is:

1. A method of equalizing a signal, the method comprising:

receiving the signal, the signal comprising a plurality of transition points;

selecting a pattern of bits based, at least in part, on a convergence time of the signal;

detecting an occurrence of the pattern of bits in the signal and identifying a transition point in the signal as the first transition point following the detected occurrence of the pattern of bits;

measuring a set of signal values associated with the first transition point; and adjusting an equalization level applied to the signal based on the measured set of signal values.

2. The method of claim 1, wherein the set of signal values comprises: a pre-transition sample value, a transition sample value, and a post-transition sample value.

3. The method of claim 1, further comprising classifying the signal as either over equalized or under equalized based on the measured set of signal values.

4. The method of claim 1, wherein adjusting the equalization level comprises incrementing a boost value by a constant and predetermined amount.

5. The method of claim 1, further comprising extracting a timing signal from the signal.

6. The method of claim 5, further comprising determining a time location for each signal value in the set of signal values based on the timing signal.

7. The method of claim 5, wherein the equalization level is adjusted at a rate slower than an update rate of a clock and data recovery loop.

8. A system comprising:

synchronization circuitry configured to:

receive a signal, the signal comprising a plurality of transition points select a pattern of bits based, at least in part, on a convergence time of the signal;

detect an occurrence of the pattern of bits in the signal and identify a transition point in the signal as the first transition point following the detected occurrence of the pattern of bits; and measure a set of signal values associated with the first transition point; and equalization circuitry configured to adjust an equalization level applied to the signal based on the measured set of signal values.

9. The system of claim 8, wherein the set of signal values comprises: a pre-transition sample value, a transition sample value, and a post-transition sample value.

10. The system of claim 8, wherein the equalization circuitry is further configured to classify the signal as either over equalized or under equalized based on the measured set of signal values.

11. The system of claim 8, wherein the equalization circuitry is further configured to adjust the equalization level by decrementing a boost value by a constant and predetermined amount.

12. The system of claim 8, wherein the synchronization circuitry is further configured to extract a timing signal from the signal.

13. The system of claim 12, wherein the synchronization circuitry is further configured to determine a time location for each signal value in the set of signal values based on the timing signal.

14. The system of claim 12, wherein the synchronization circuitry is further configured to adjust the equalization level at a rate slower than an update rate of a clock and data recovery loop.

15. A method of equalizing a data signal, the method comprising:

receiving the data signal, the data signal representing a plurality of bits;

determining a reference pattern of bits based, at least in part, on a convergence time of the data signal;

identifying a portion of the data signal as corresponding to bits that match the reference pattern;

identifying a transition point in the data signal as the first transition point following the identified portion of the data signal;

measuring a set of amplitude values associated with the first transition point; and equalizing the data signal based on the measured set of amplitude values.

16. The method of claim 15, wherein equalizing the data signal comprises counting a number of over equalized samples and a number of under equalized samples from the data signal.

17. The method of claim 15, further comprising extracting a timing signal from the data signal.

18. The method of claim 17, further comprising determining time locations of a set of signal values based on the timing signal.

19. The method of claim 17, wherein the equalizing is performed at a rate that is determined in response to an update rate of a clock and data recovery loop.

* * * * *